United States Patent [19]

Fabian

[11] Patent Number: 5,790,736
[45] Date of Patent: Aug. 4, 1998

[54] QUARTZ GLASS PREFORM FOR OPTICAL WAVEGUIDE

[75] Inventor: Heinz Fabian, Freigericht, Germany

[73] Assignee: Heraeus Quarzglas GmbH, Hanau, Germany

[21] Appl. No.: 598,925

[22] Filed: Feb. 9, 1996

[30] Foreign Application Priority Data

Feb. 21, 1995 [DE] Germany .................. 195 05 929.8

[51] Int. Cl.$^6$ ....................................... G02B 6/02
[52] U.S. Cl. ............................. 385/128; 385/122
[58] Field of Search ........................... 385/122–128

[56] References Cited

U.S. PATENT DOCUMENTS

| | | | |
|---|---|---|---|
| 4,372,647 | 2/1983 | Okamoto et al. | 385/127 |
| 4,610,506 | 9/1986 | Tokunaga et al. | 385/128 |
| 4,913,518 | 4/1990 | Fine | 350/96.29 |
| 4,938,562 | 7/1990 | Vacha et al. | 350/96.34 |

FOREIGN PATENT DOCUMENTS

| | | |
|---|---|---|
| 0149740 | 6/1990 | European Pat. Off. . |
| 0408873 | 1/1991 | European Pat. Off. . |
| 0432421 | 6/1991 | European Pat. Off. . |
| 0434237 | 6/1991 | European Pat. Off. . |
| 2145840 | 4/1985 | United Kingdom ............. 385/128 |

OTHER PUBLICATIONS

Volf, "Chemical Approach to Glass", Elsevier 1984, p. 284 no month.

Ullmann's Encyclopedia of Industrial Chemistry, 5th Ed., vol. 23, pp. 606–607 1993 no month.

Tanaka et al., "Characteristics of Pure Silica Core Single-Mode Fiber", Fiber and Integrated Optics, vol. 7, pp. 47–56 (1988), no month.

*Primary Examiner*—Phan T. H. Palmer
*Attorney, Agent, or Firm*—Felfe & Lynch

[57] ABSTRACT

In an optical component having a cylindrical core of quartz glass and a coaxial jacket of quartz glass containing a dopant which decreases the index of refraction, the jacket glass contains a viscosity-increasing stiffening agent to reduce tensile strength on the core at drawing temperature of 1000° to 2500° C. or a relaxation agent for lowering the viscosity of the quartz glass in a concentration which is lower than that present in the core glass.

17 Claims, 1 Drawing Sheet

QUARTZ GLASS PREFORM FOR OPTICAL WAVEGUIDE

BACKGROUND OF THE INVENTION

The invention pertains to an optical component for the transmission of light, the component being provided with a cylindrical core consisting of a core glass which contains quartz glass and also with a jacket glass coaxially surrounding the core glass, the jacket glass containing quartz glass and a dopant which lowers the index of refraction of the quartz glass.

An optical component of this type can be an optical waveguide or a preform for the production of an optical waveguide. It is known that optical waveguides of quartz glass with an undoped core can have low attenuation values. In the publication by Gotaro Tanaka et al. in Fiber and Integrated Optics, Vol. 7, pp. 47–56, a so-called "single-mode" fiber with a core of pure, undoped quartz glass and with a jacket of fluorine-doped quartz glass is described by way of example. Attenuation values of less than 0.16 dB/km were measured in the fiber at light wavelengths of 1.5 μm. The theoretical minimum attenuation for optical waveguides of this type is still slightly below this measurement value. In spite of their low theoretical attenuation values, however, single-mode fibers with a pure quartz glass core have not become commercially successful; those with a germanium-doped core, however, have become commercially successful. One reason for this is to be found in the difficulty of drawing fibers from preforms with a pure quartz glass core and a doped jacket glass. During the drawing of the fiber, temperatures of around 2,000° C. are usually used. At these temperatures, the viscosity of the fluorine-doped jacket glass is lower than that of the core glass of pure quartz glass. The drawing parameters such as the drawing speed and the drawing temperature must therefore be carefully coordinated with each other and maintained. The drawing of these fibers is therefore relatively expensive. In addition, the drawing forces are absorbed primarily by the "harder" core glass, which is therefore put under tensile stress. It has been found that tensile stresses bring about an increase in the scattering and therefore in the attenuation of the light.

SUMMARY OF THE INVENTION

An optical component with very low attenuation values can be achieved when the jacket glass also contains a viscosity-increasing stiffening agent and/or the jacket glass contains a relaxation agent for lowering the viscosity of quartz glass in a concentration which is smaller than that present in the core glass.

The optical component can be either a preform or an optical waveguide which has been drawn from the preform. The jacket glass is doped with a dopant which decreases the index of refraction. The dopant usually brings about a reduction in the viscosity of the jacket glass, especially at the temperatures which are required for the drawing of the optical waveguide from the preform.

In a first variant of the invention, the jacket glass is doped not only with the desired dopant but also with a viscosity-increasing stiffening agent. The higher the concentration of stiffening agent in the jacket glass, the higher the viscosity of the jacket glass during the drawing of the optical waveguide. Through the suitable choice of the concentration of stiffening agent, it is possible to adjust the viscosity of the jacket glass at these temperatures in such a way that the drawing process induces little or no tensile stress in the core glass. As a result, the core of the preform or of the optical waveguide can contain pure quartz glass.

In another variant of the invention, both the jacket glass and the core glass are doped with a relaxation agent. The relaxation agent has the effect of reducing the viscosity of quartz glass at conventional drawing temperatures. At the same time, it can also have the effect of increasing the index of refraction of quartz glass. Because the relaxation agent is present in the core glass, it may have no effect or only a negligible effect on the scattering and therefore on the attenuation of the light in the quartz glass. In this respect, its concentration in the quartz glass of the core should be kept as low as possible. On the other hand, because the difference between the viscosity of the jacket glass and that of the core glass depends on the difference between the concentrations of relaxation agent they contain, the greater the difference in the concentration of relaxation agent, the greater the difference in viscosity during the drawing of the optical waveguide. The concentration of relaxation agent in the jacket glass can be very low or even zero. The for example, the viscosity of the jacket glass can also be affected by additional dopants. The decisive factor again is that, through the suitable choice of the difference between the concentrations of the relaxation agent, the viscosities of the core and jacket glasses at the drawing temperatures are to be adjusted in such a way that the drawing process induces little or no tensile stress in the core glass. As a result, the core of the preform or of the optical waveguide can contain quartz glass which is completely pure except for the relaxation agent.

In a third variant of the invention, as a first measure, the jacket glass is doped not only with the dopant but also with a viscosity-increasing stiffening agent, and, as a second measure, the jacket glass and also the core glass are doped with a relaxation agent. The two measures supplement each other with respect to the equalization of the viscosities of the core and jacket glasses, and each contributes independently of each other to the inducement of compressive stress in the core glass.

It is not necessary for the core glass and the jacket glass to have a common boundary surface; the key point is that the core glass is put under compressive stress during the drawing of the fiber. This can be ensured even when an additional glass layer is present between the jacket glass and the core glass.

A component which contains fluorine and/or boron as dopant has been found to give especially good results. The fluorine is usually present in anionic form, the boron as boron oxide. Both doping with fluorine and doping with boron decrease the viscosity of the doped quartz glass below that of pure quartz glass in the temperature range of, for example, 1,000°–2,500° C. In addition, both fluorine and boron reduce the index of refraction of quartz glass. Jacket glass doped with boron and/or fluorine is therefore suitable for the production of a preform for optical waveguides with a core of pure quartz glass. It has been found that the decrease in the viscosity of the jacket glass caused by the dopants cited can be reduced or compensated by the addition of a stiffening agent.

Aluminum and/or nitrogen have been found especially reliable as stiffening agents. Aluminum is present in the jacket glass as aluminum oxide; nitrogen is present in anionic form. The stiffening agents cited have only a slight effect on the optical properties of the jacket glass. Both aluminum and nitrogen change the index of refraction only slightly in comparison with that of pure quartz glass and are highly compatible with boron and fluorine.

A component in which the relaxation agent contains chlorine has also been found to be advantageous. The chlorine is present in the quartz glass in anionic form. It leads to a reduction in the viscosity of the quartz glass in the temperature range of, for example, 1,000°–2,500° C. Doping with chlorine has only a slight effect on the optical properties of quartz glass. Chlorine is used as a drying agent during the production of the preforms for optical waveguides and is therefore usually present in the preforms and in the optical waveguides produced from them, although only in small concentrations. Chlorine concentrations in the core glass of up to a maximum of 3,000 ppm have been found effective. It is advantageous for the chlorine concentration in the jacket glass to be less than 50% of the chlorine concentration in the core glass. The decrease in viscosity below that of pure quartz glass brought about by the doping of the jacket can be reduced or completely compensated by adjusting the difference between the chlorine concentrations in the core glass and in the jacket glass. It is therefore possible to keep the core glass essentially free of tensile stresses or even to induce compressive stresses in it.

An optical component is preferred in which the jacket glass has an inner and an outer layer, the inner layer being doped with a dopant capable of lowering the index of refraction, the outer layer containing a viscosity-increasing stiffening agent. When a component such as this is used as a preform for the drawing of optical waveguides, the increase in the viscosity of the outer layer ensures that the tensile forces occurring during the drawing of fiber are absorbed entirely or partially by this layer. As a result, it is possible to keep the core essentially free of tensile forces during the drawing of the fiber. In the optical waveguides drawn from a preform of this type, the core is therefore essentially free of the tensile stresses which would be attributable to the tensile forces acting on it during the drawing of the fiber. The inner layer can have a relatively low viscosity. It is not necessary for the inner layer to contain the stiffening agent. For example, the core of the component can consist of pure quartz glass; the adjacent inner layer of the jacket contain a refractive index-lowering dopant such as fluorine and/or boron; and the following outer layer of the jacket can contain, in addition to quartz glass, a stiffening agent such as aluminum and/or nitrogen.

An optical component in which the surface of the cylindrical jacket is formed by a sheath glass axially surrounding the jacket glass, the coefficient of thermal expansion of this sheath glass being smaller than that of the jacket glass in the temperature range of 1,000°–2,500° C., has been found especially advantageous. It is known that compressive stresses in the near-surface layers promote strength. To produce compressive stresses in the surface of the component, the sheath glass can consist of titanium-doped quartz glass.

DETAILED DESCRIPTION OF THE PREFERRED EMBODIMENTS

Figure 1:
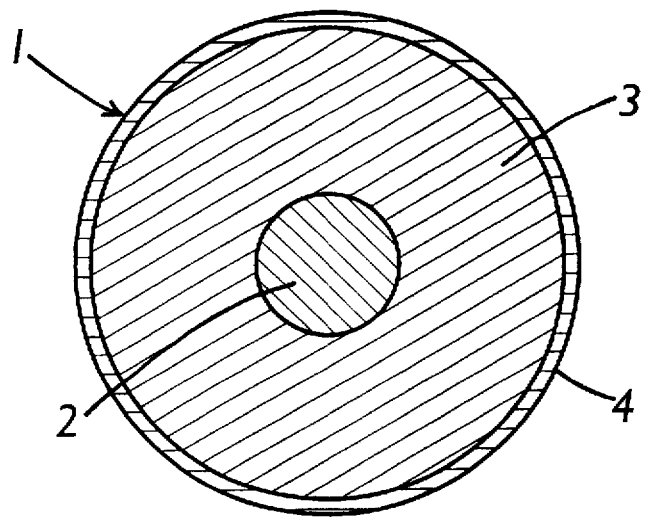
FIG. 1 is a schematic radial cross section of a single-mode fiber.

In FIG. 1, fiber 1 consists of a core 2, a jacket 3 which surrounds the core coaxially and has a common boundary surface with the core, and a sheath glass 4 which forms the surface of optical waveguide 1.

The diameter of core 2 is approximately 8 µm; the outside diameter of jacket 3 is approximately 125 µm; and sheath layer 4 is approximately 2 µm thick.

Core 2 consists of pure quartz glass, a glass in which the conventional impurities are present in the ppb range and which has an OH content of less than 0.1 ppm. Fluorine-doped quartz glass is used as the jacket glass 3. The doping with fluorine brings about a decrease in the index of refraction relative to that of the core glass of $5 \times 10^{-3}$, which corresponds to a fluorine concentration of approximately 15,000 ppm. In addition, the jacket glass also contains aluminum oxide in a concentration of 10 ppm. Sheath layer 4 consists of quartz glass which has been doped with approximately 5 ppm of titanium.

Because pure quartz glass is used for core 2, it is possible to achieve optimally low attenuation values in single-mode fiber 1. The reduction in the index of refraction with respect to that of the core glass required to achieve the optical waveguide property is achieved by doping jacket 3 with fluorine. The doping of jacket 3 with aluminum has only a slight effect on the difference between the indices of refraction of core 2 and jacket 3. In contrast, the doping with aluminum brings about a significant increase in the viscosity of the jacket glass in the temperature range of 1,000°–2,500° C. versus a jacket glass doped only with fluorine. Doping with aluminum therefore makes it possible to increase the viscosity of the fluorine-doped jacket glass. When optical waveguide 1 is drawn, therefore, the drawing forces are absorbed primarily by jacket 3. As a result, core 2 is put under compressive stress when the waveguide is cooled. In contrast to tensile stresses, the compressive stresses do not cause any impairment to the optical properties of the core glass. Sheath glass 4 is provided to produce a compressive stress layer in the area of the surface. The coefficient of thermal expansion of titanium-doped quartz glass is smaller than that of the jacket glass, with the result that, during cooling, sheath glass 4 is put under compressive stress by jacket 3, which undergoes greater shrinkage.

By means of the single-mode optical waveguide shown in FIG. 1, attenuation values of less than 0.18 dB/km can be achieved at light wavelengths of around 1.5 µm.

In a further elaboration of a single-mode fiber (not shown in the figure), the geometric dimensions of the core, jacket, and sheathing layer are the same as those which have already been described above on the basis of FIG. 1 of the first exemplary embodiment. In this exemplary embodiment, however, the core glass of the single-mode fiber consists of quartz glass which has been doped with 2,000 ppm of chlorine. Otherwise, the core glass contains no other doping elements. The jacket surrounding the core glass consists of fluorine-doped quartz glass. The doping with fluorine brings about a reduction in the index of refraction relative to the core glass of $5 \times 10^{-3}$. In addition, the jacket glass is also doped with approximately 200 ppm of chlorine.

The relatively high chlorine doping of the core glass has the effect of decreasing the viscosity of the core glass below that of pure quartz glass and also below that of the jacket glass. The viscosity is decreased to such an extent that, when the fiber is drawn, the tensile forces are absorbed primarily by the harder jacket glass, as a result of which the core glass is put under compressive stress during cooling.

Figure 2:
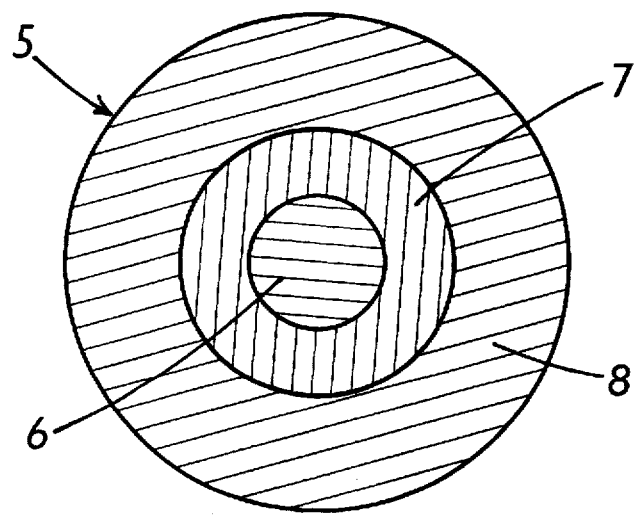
FIG. 2 shows a radial cross section of a preform for a single-mode fiber.

In FIG. 2, which shows a preform 5 for a single-mode fiber, core glass 6 is surrounded by an inner jacket layer 7 and by an outer jacket layer 8. Core glass 6 consists of undoped quartz glass. Inner jacket layer 7 consists of quartz glass doped with fluorine to lower the index of refraction. Outer jacket layer 8 consists of quartz glass and contains aluminum oxide as a viscosity-increasing stiffening agent. Outer jacket layer 8 may or may not contain fluorine. Inner jacket layer 7 has a relatively low viscosity at the fiber-drawing temperature of 2,000° C.; core glass 6 and especially outer jacket layer 8, however, have relatively high viscosities. When the optical waveguides are drawn from preform 5, the high viscosity of outer jacket layer 8 guarantees that the tensile forces which develop during the drawing of the fiber are absorbed entirely or mostly by this layer 8. The cross-sectional area of outer jacket layer 8 also contributes to this, which, as seen in the direction of the longitudinal axis of preform 5, is much larger than that of core glass 6. It is therefore possible to keep core glass 6 essentially free of tensile forces during the drawing of the fiber. In the case of the single-mode fibers drawn from preform 5, the core is therefore essentially free of the tensile stresses which would have been attributable to the tensile forces acting on it during the drawing of the fiber.

What is claimed is:

1. Optical component for the transmission of light, said component comprising:
    a cylindrical core consisting of one of quartz glass and a combination consisting of quartz glass and a relaxation agent,
    a jacket coaxially surrounding said cylindrical core, said jacket comprising quartz glass and a dopant which lowers the index of refraction of the jacket relative to the index of refraction of the core, and
    the core having a lower viscosity than the viscosity of the jacket at a drawing temperature in the range of 1000°–2500° C., said difference in viscosity being due to the presence of at least one of said relaxation agent in said core and a stiffening agent in said jacket.

2. Optical component as in claim 1 wherein the lower viscosity of the core relative to the viscosity of the jacket is due to the presence of at least said relaxation agent in said core.

3. Optical component as in claim 2 wherein said jacket further comprises said relaxation agent, the concentration of relaxation agent in said jacket being less than the concentration of said relaxation agent in said core.

4. Optical component as in claim 3 wherein the concentration of relaxation agent in said core is no more than 3000 ppm, and the concentration of relaxation agent in the jacket is less than 50% of the concentration in the core.

5. Optical component as in claim 2 wherein said relaxation agent consists of chlorine having a concentration up to a maximum of 3000 ppm.

6. Optical component as in claim 1 wherein the lower viscosity of the core relative to the viscosity of the jacket is due to the presence of at least said stiffening agent in said jacket.

7. Optical component as in claim 6 wherein said stiffening agent contains at least one of aluminum and nitrogen.

8. Optical component as in claim 1 wherein said dopant contains at least one of fluorine and boron.

9. Optical component as in claim 1 wherein said jacket comprises an inner jacket and an outer jacket, said inner jacket containing said dopant, and the outer jacket having a stiffening agent therein.

10. Optical component as in claim 1 further comprising a sheath coaxially surrounding said jacket, said sheath comprising glass having a coefficient of expansion which is smaller than the coefficient of expansion of the jacket at a temperature in the range of 1000°–2500° C.

11. Optical component for the transmission of light, said component comprising
    a cylindrical core consisting of pure quartz glass, and
    a jacket coaxially surrounding said cylindrical core, said jacket comprising a dopant which lowers the index of refraction of the jacket relative to the index of refraction of the core, and a stiffening agent which increases the viscosity of the jacket relative to the viscosity of the core at a drawing temperature of 1000°–2500° C.

12. Optical component as in claim 11 wherein said stiffening agent contains at least one of aluminum and nitrogen.

13. Optical component for the transmission of light, said component comprising
    a cylindrical core consisting of quartz glass and a relaxation agent, and
    a jacket coaxially surrounding said cylindrical core, said jacket comprising a dopant which lowers the index of refraction of the jacket relative to the index of refraction of the core.

14. Optical component as in claim 13 wherein said relaxation agent is chlorine having a concentration up to a maximum of 3000 ppm.

15. Optical component as in claim 14 wherein said jacket further comprises chlorine having a concentration which is lower than the concentration of chlorine in said core.

16. Optical component as in claim 13 wherein said jacket further comprises a stiffening agent.

17. Optical component as in claim 16 wherein said stiffening agent comprises at least one of aluminum oxide and nitrogen in anionic form.

* * * * *